(12) United States Patent
Kitamura et al.

(10) Patent No.: US 8,402,664 B1
(45) Date of Patent: Mar. 26, 2013

(54) ELECTRIC CONTROL DEVICE

(75) Inventors: Satoshi Kitamura, Nara (JP); Shintaro Mori, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/283,801

(22) Filed: Oct. 28, 2011

(51) Int. Cl.
*B62M 25/08* (2006.01)
*B62K 23/04* (2006.01)
*H01H 9/06* (2006.01)

(52) U.S. Cl. .................. 33/1 PT; 200/61.85; 200/61.88
(58) Field of Classification Search .................. 33/1 PT; 74/473.3, 488; 200/61.85, 61.88; 340/432
See application file for complete search history.

(56) References Cited

U.S. PATENT DOCUMENTS

| | | | |
|---|---|---|---|
| 4,719,795 A | 1/1988 | Eitoku et al. | |
| 5,083,108 A * | 1/1992 | Guest | 340/432 |
| 6,012,353 A * | 1/2000 | Kawakami | 74/502.2 |
| 6,276,230 B1 * | 8/2001 | Crum et al. | 74/551.9 |
| 6,296,072 B1 * | 10/2001 | Turner | 180/220 |
| 6,396,020 B1 | 5/2002 | Thelen et al. | |
| 6,418,368 B2 * | 7/2002 | Jinbo et al. | 701/70 |
| 6,588,296 B2 * | 7/2003 | Wessel | 74/502.2 |
| 6,590,763 B2 | 7/2003 | Kishimoto | |
| 6,595,894 B2 * | 7/2003 | Hanatani | 475/349 |
| 6,698,307 B2 * | 3/2004 | Wesling et al. | 74/473.13 |
| 6,832,511 B2 | 12/2004 | Samoto et al. | |
| 7,350,436 B2 * | 4/2008 | Fujii | 74/473.13 |
| 7,354,320 B2 * | 4/2008 | Onogi et al. | 439/851 |
| 7,379,798 B2 * | 5/2008 | Takeda et al. | 701/1 |
| 7,757,581 B2 * | 7/2010 | Okamoto | 74/502.6 |
| 7,779,724 B2 * | 8/2010 | Fujii | 74/551.8 |
| 7,900,946 B2 * | 3/2011 | Hara et al. | 280/260 |
| 7,947,914 B2 * | 5/2011 | Takebayashi et al. | 200/61.88 |
| 2005/0275561 A1 * | 12/2005 | Kolda et al. | 340/870.07 |
| 2009/0013834 A1 | 1/2009 | Richardson | |
| 2010/0132500 A1 | 6/2010 | Cominetti et al. | |
| 2011/0036196 A1 * | 2/2011 | Menghini | 74/488 |
| 2011/0303041 A1 * | 12/2011 | Cheng et al. | 74/488 |
| 2012/0280676 A1 * | 11/2012 | Iwahashi | 324/207.11 |

FOREIGN PATENT DOCUMENTS

WO   WO 02071019 A1 * 9/2002

* cited by examiner

*Primary Examiner* — R. A. Smith
(74) *Attorney, Agent, or Firm* — Global IP Counselors, LLP

(57) ABSTRACT

An electric control device is provided with a fixed member, a user operating member and a position sensing unit. The fixed member has a bicycle mounting part. The user operating member is movably mounted to the fixed member. The user operating member includes a first magnetic element. The position sensing unit has a rotating member and a position sensor. The position sensor senses a position of the rotating member. The rotating member includes a second magnetic element that rotates the rotating member as the user operating member is moved. At least one of the first and second magnetic elements is configured to generate a magnetic field.

16 Claims, 10 Drawing Sheets

| STAGE POSITION | GRIP ANGLE (Deg.) | OUTPUT VOLTAGE (mV) | DIGITAL DATA 10bitAD LSB |
|---|---|---|---|
| 1 | -75 | V1 | D1 |
| 2 | -60 | V2 | D2 |
| 3 | -45 | V3 | D3 |
| 4 | -30 | V4 | D4 |
| 5 | -15 | V5 | D5 |
| 6 | 0 | V6 | D6 |
| 7 | 15 | V7 | D7 |
| 8 | 30 | V8 | D8 |
| 9 | 45 | V9 | D9 |
| 10 | 60 | V10 | D10 |
| 11 | 75 | V11 | D11 |

ELECTRIC CONTROL DEVICE

BACKGROUND

1. Field of the Invention

This invention generally relates to an electric control device for controlling a bicycle component such as a transmission, a suspension, a seat post, etc. More specifically, the present invention relates to an electric control device using magnetic elements for indicating an input operation of the control device by a rider.

2. Background Information

Twist-grip control devices have been used with bicycles to pull and release transmission control elements in response to rotation of a twist-grip operating member that rotates coaxially with a handlebar axis. An example of such a twist-grip device is disclosed in U.S. Pat. No. 7,757,581. The twist-grip device disclosed in that patent includes a twist-grip operating member that rotates coaxially around a handlebar axis and a cable reel that rotates coaxially with the operating member for winding and unwinding a transmission control cable. The operating member rotates in clockwise and counterclockwise directions from a center position to rotate the cable reel. A retainer mechanism maintains the cable reel in the selected position.

SUMMARY

One aspect presented in the present disclosure is to provide an electric control device that uses magnetic elements for indicating an input operation of the control device by a rider.

In view of the state of the known technology, an electric control device is provided that basically comprises a fixed member, a user operating member and a position sensing unit. The fixed member has a bicycle mounting part. The user operating member is movably mounted to the fixed member. The user operating member includes a first magnetic element. The position sensing unit has a rotating member and a position sensor. The position sensor senses a position of the rotating member. The rotating member includes a second magnetic element that rotates the rotating member as the user operating member is moved. At least one of the first and second magnetic elements is configured to generate a magnetic field.

These and other objects, features, aspects and advantages of the electric control device will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
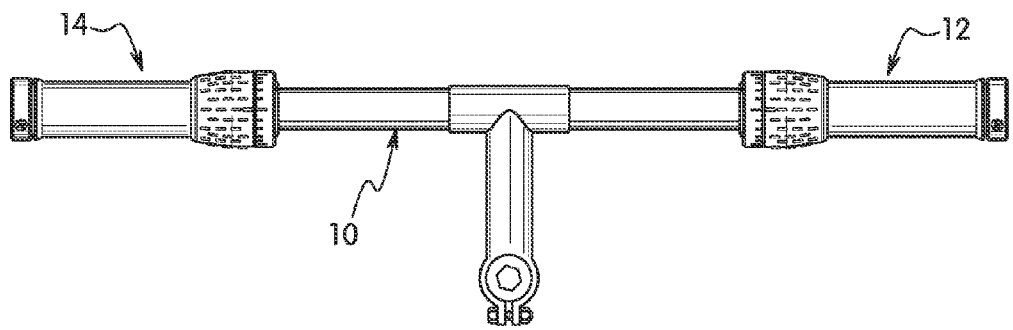
FIG. 1 is a top plan view of a bicycle handlebar that has two bicycle electric control devices in the form of bicycle twist shifters in accordance with one embodiment.
Figure 2:
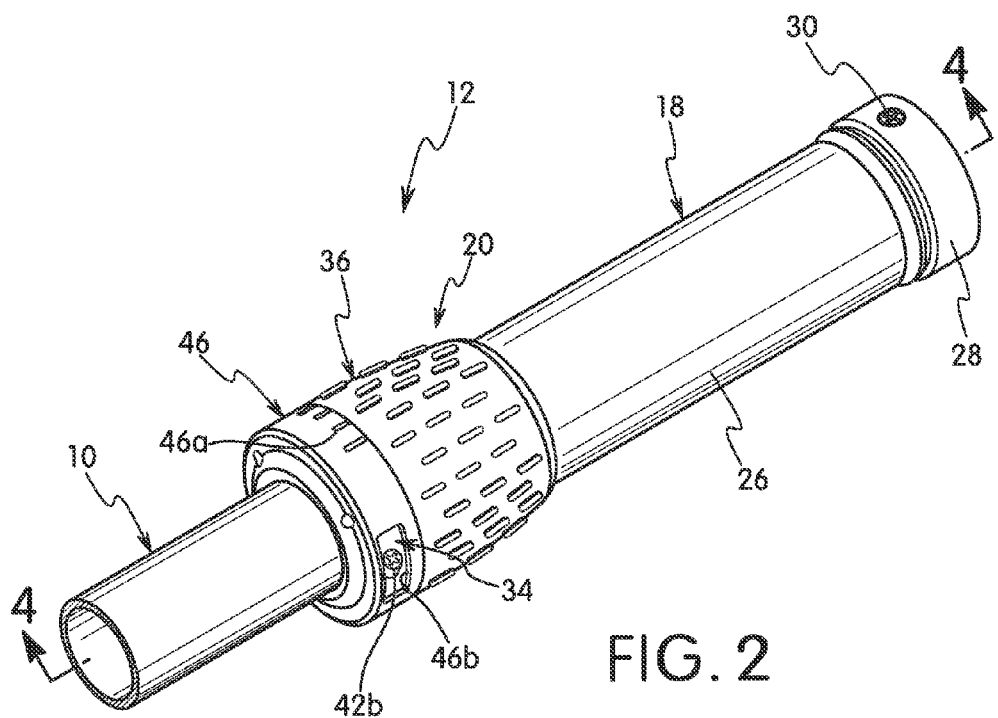
FIG. 2 is a top perspective view of the right electric control device illustrated in FIG. 1.

Referring initially to FIG. 1, a bicycle handlebar 10 is illustrated that is provided with a pair of electric control devices 12 and 14 in accordance with a first embodiment. In the illustrated embodiment, the electric control devices 12 and 14 are electric twist shifters that operatively control electric gear changing devices (not shown). The gear changing devices are part of a conventional bicycle driving system that is used to shift a bicycle chain for changing speeds of the drive train in a relatively conventional manner. Thus, the gear changing devices will not be shown or described herein. In the illustrated embodiment, the electric control devices 12 and 14 are essentially identical in operation, except that they are mirror images of each other and they may have a different number of shift operations. In other words, the electric control device 14 is substantially identical to the electric control device 12, except that the electric control device 14 has been modified to be a mirror image and to decrease the number of gears that can be shifted. Thus, only the electric control device 12 will be discussed and illustrated herein.

Since the electric control device 12 is a twist type shifter that is mounted to the bicycle handlebar 10, the electric control device 12 includes a grip unit 18 that is mounted to the bicycle handlebar 10. However, it will be apparent to those skilled in the art from this disclosure that the electric control device 12 can be mounted elsewhere such that the grip unit 18 is not utilized. Furthermore, in the illustrated embodiment, the electric control device 12 includes a user operating unit 20 and a position sensing unit 22. The electric control device 12 further includes a battery unit 24 that is electrically connected to the position sensing unit 22 for supplying electrical power to the position sensing unit 22. The position sensing unit 22 and the battery unit 24 are dimension to be received within the bicycle handlebar 10.

Basically, as discussed below, a magnetic field is generated between the user operating unit 20 and the position sensing unit 22. Using the generated magnetic field, the position sensing unit 22 senses the operation (i.e., rotation or twisting in the illustrated embodiment) of the user operating unit 20 by the rider, and then transmits data indicative of the operation of the user operating unit 20 to a bicycle component such as a derailleur or internally geared hub. As explained below, in the illustrated embodiment, the position sensing unit 22 wirelessly transmits positioning data indicative of a current position of the user operating unit 20 to a bicycle component. However, it will be apparent to those skilled in the art from this disclosure that the position sensing unit 22 can be electrically connected to a bicycle component with a wire, if needed and/or desired.

Turning first to the grip unit 18, in the illustrated embodiment, the grip unit 18 includes a grip member 26, an end cap 28, a pair of set screws 30 (only one shown) and a pair of lugs 32. The grip member 26 is typically a soft elastomeric tube that is mounted onto the handlebar 10 so that the rider can comfortably grip the handlebar 10. The end cap 28 is a hard plastic or metal member. The end cap 28 is secured to an outer end of the grip member 26 by the set screws 30 that squeezes a C-shaped clamp member 33 on the grip member 26 for fixing the outer end of the grip member 26 and the end cap 28 to the handlebar 10. The lugs 32 attach an inner end of the grip member 26 to the user operating unit 20 so that the inner end of the grip member 26 does not move on the handlebar 10.

Now the user operating unit 20 will be discussed in more detail with reference to FIGS. 4 to 6. Basically, the user operating unit 20 includes a fixed member 34 and a user operating member 36. The fixed member 34 fixedly secures the user operating unit 20 onto the handlebar 10, while the user operating member 36 is rotatably mounted to the fixed member 34. The user operating unit 20 has a center rotation axis R that coincides with a center longitudinal axis of the handlebar 10. Thus, the user operating member 36 is mounted onto the handlebar 10 such that the rider can rotate the user operating member 36 on the handlebar 10. Since the electric control device 12 is a twist type shifter that is mounted to the bicycle handlebar 10, the user operating unit 20 also preferably has a position setting unit 38 for maintaining a selected position of the user operating member 36 relative to the handlebar 10 and the fixed member 34. In this way, when the rider rotates or twists the user operating member 36 on the handlebar 10 and the fixed member 34, the user operating member 36 will stay in the selected position relative to the handlebar 10 and the fixed member 34 once the rider lets go of the user operating member 36. Thus, the user operating unit 20 constitutes a shifter with the position setting unit 38 constitutes an indexing device of the shifter.

Now the fixed member 34 will be discussed in more detail with reference mainly to FIGS. 5 and 6. Basically, the fixed member 34 includes a bicycle mounting part 42 for clamping onto the handlebar 10. The bicycle mounting part 42 is a conventional type of tube clamp that includes a band clamp 42a and a clamping bolt 42b. When the clamping bolt 42b is rotated to draw the free ends of the clamp 42a together, the band clamp 42a then squeezes the handlebar 10. Preferably, the fixed member 34 further includes a support member 44 and a cover 46. The support member 44 supports the user operating member 36 and the position setting unit 38 on the handlebar 10. The cover 46 is fixedly secured to the support member 44 by a plurality of fasteners 48 (e.g., screws), while the band clamp 42a is fixedly secured to the support member 44 by a set screw 50. Thus, the support member 44 and the cover 46 are both non-movably fixed to the handlebar 10 by the bicycle mounting part 42. The cover 46 overlies the bicycle mounting part 42 to conceal the band clamp 42a. Preferably, the cover 46 is provided with a plurality of marks 46a (i.e., indicia) for indicating a selected position of the user operating member 36 relative to the handlebar 10 and the fixed member 34. An opening 46b is provided in the cover 46 for accessing the clamping bolt 42b.

Now the user operating member 36 will be discussed in more detail with reference mainly to FIGS. 5 and 6. As mentioned above, the user operating member 36 is movably mounted (i.e., rotatably in the illustrated embodiment) to the fixed member 34. The user operating member 36 rotates or twists on the handlebar 10 about the rotation axis R shown in FIG. 4. Basically, as best seen in FIG. 4, the user operating member 36 includes a grip cover 52, a twist member 54 and a first magnetic element 56. As discussed below, the grip cover 52, the twist member 54 and the first magnetic element 56 all move (rotate) together as a unit on the fixed member 34. It is desirable to provide a comfortable feeling for the rider's hand while the rider is gripping the user operating member 36. Thus, the grip cover 52 is preferably a soft elastomeric member formed of a suitable elastomeric material. On the other hand, the twist member 54 is a rigid member that is made of a suitable material such as a rigid, hard plastic material. The grip cover 52 is a conically shaped tubular member that has a plurality of recesses 52a formed on its inner surface and a cutout 52b in an edge of is its larger diameter end. The twist member 54 is a conically shaped tubular member that mates with the grip cover 52. Preferably, the twist member 54 has a plurality of outer projections 54a and a protrusion 54b that are formed on its outer surface. The outer projections 54a mate with the recesses 52a and the protrusion 54b mates with the cutout 52b such that the grip cover 52 and the twist member 54 do not rotate relative to each other. The protrusion 54b also acts as an indicator or pointer for aligning with one of the marks 46a on the cover 46 to indicate the selected shift position. The twist member 54 has a plurality of inner projections 54c formed on its inner surface for engaging the first magnetic element 56 such that the grip cover 52, the twist member 54 and the first magnetic element 56 all move (rotate) together as a unit on the fixed member 34.

In the illustrated embodiment, the first magnetic element 56 includes a body member 56a and a plurality of permanent magnets 56b. The body member 56a is a tubular member formed of a hard rigid material such as a hard, rigid plastic material. The permanent magnets 56b are disposed in recesses formed in an inner cylindrical surface of the body member 56a. However, it will be apparent to those skilled in the art from this disclosure that the first magnetic element 56 can be formed with only one permanent magnet or can be formed with magnet particles embedded within a base material that is molded to form the body member 56a. Alternatively, the first magnetic element 56 can include one or more electromagnets.

Also when the position sensing unit 22 generates a magnetic field, as discussed below, the first magnetic element 56 does not need to be a magnet that produces its own persistent magnetic field in the absence of an applied magnetic field. Rather, the first magnetic element 56 can be formed with a magnetic material or metal (e.g. iron) that does not produces its own persistent magnetic field in the absence of an applied magnetic field, when the position sensing unit 22 generates a magnetic field. In such a case of the position sensing unit 22 generating a magnetic field, the body member 56a of the first magnetic element 56 can be integrally formed with a magnetic metal (e.g. iron), or can have separate pieces of a magnetic material attached thereto in place of the permanent magnets 56b.

In the illustrated embodiment, the first magnetic element 56 has a plurality of recesses 56c formed on its outer surface for engaging the position setting unit 38 as discussed below.

Also the first magnetic element 56 has a plurality of recesses 56d formed on its inner surface for engaging the inner projections 54c of the twist member 54 such that the grip cover 52, the twist member 54 and the first magnetic element 56 all move (rotate) together as a unit on the fixed member 34.

Figure 4:
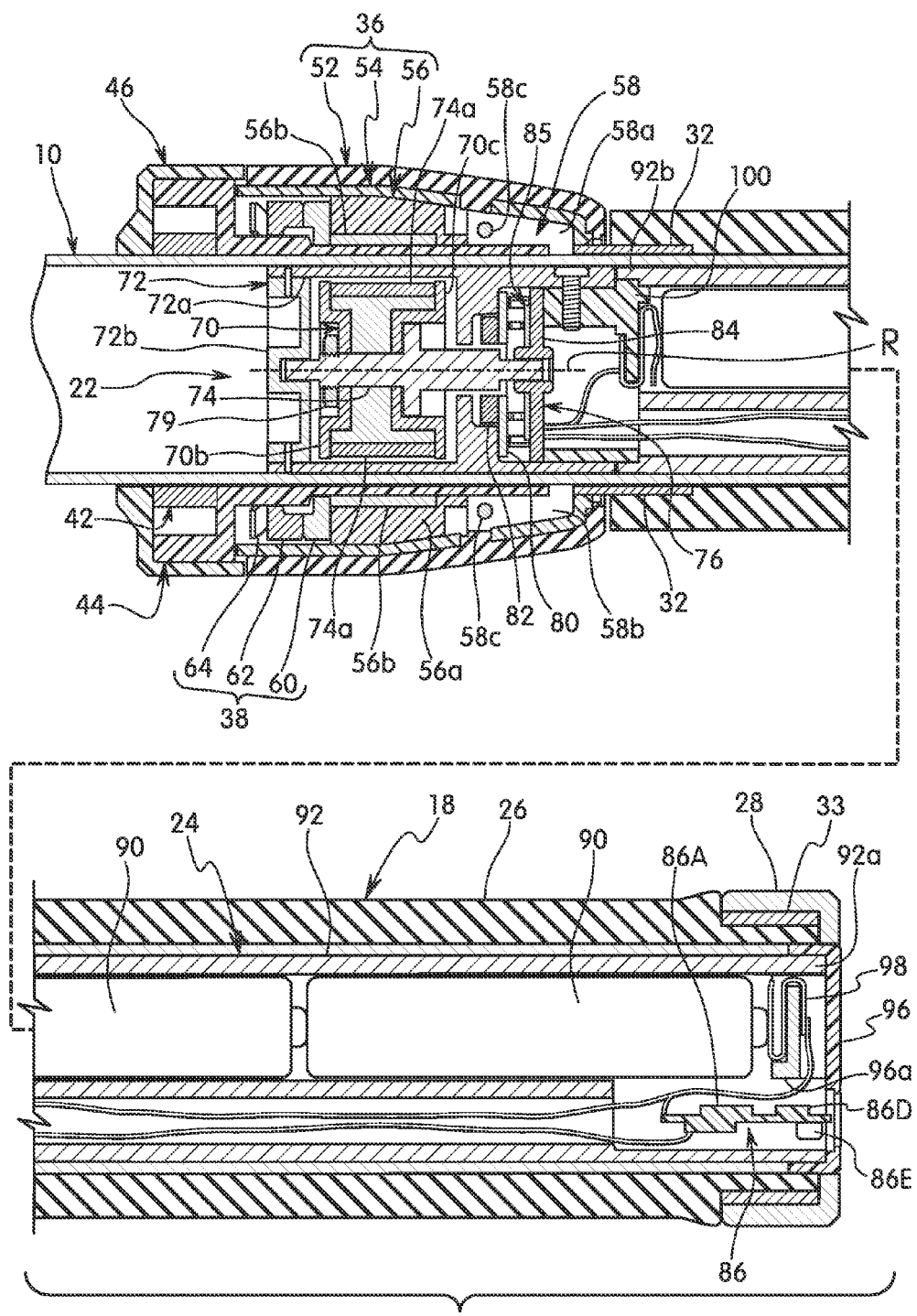
FIG. 4 is a longitudinal cross sectional view of the right electric control device illustrated in FIGS. 1 and 2 as seen along section line 4-4 of FIG. 2.
Figure 5:
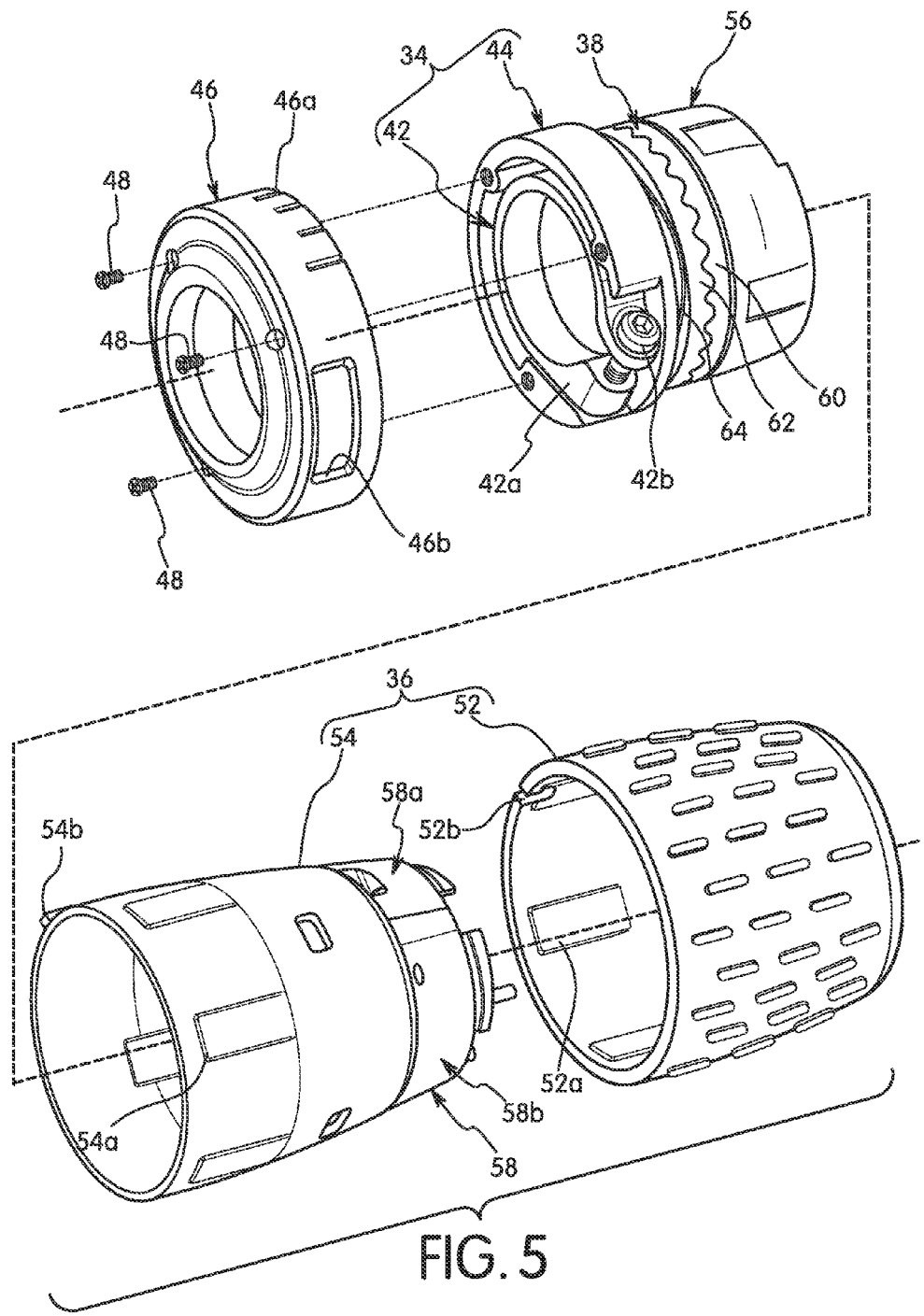
FIG. 5 is an exploded top perspective view of the shifting unit of the right electric control device illustrated in FIGS. 1 to 4.
Figure 6:
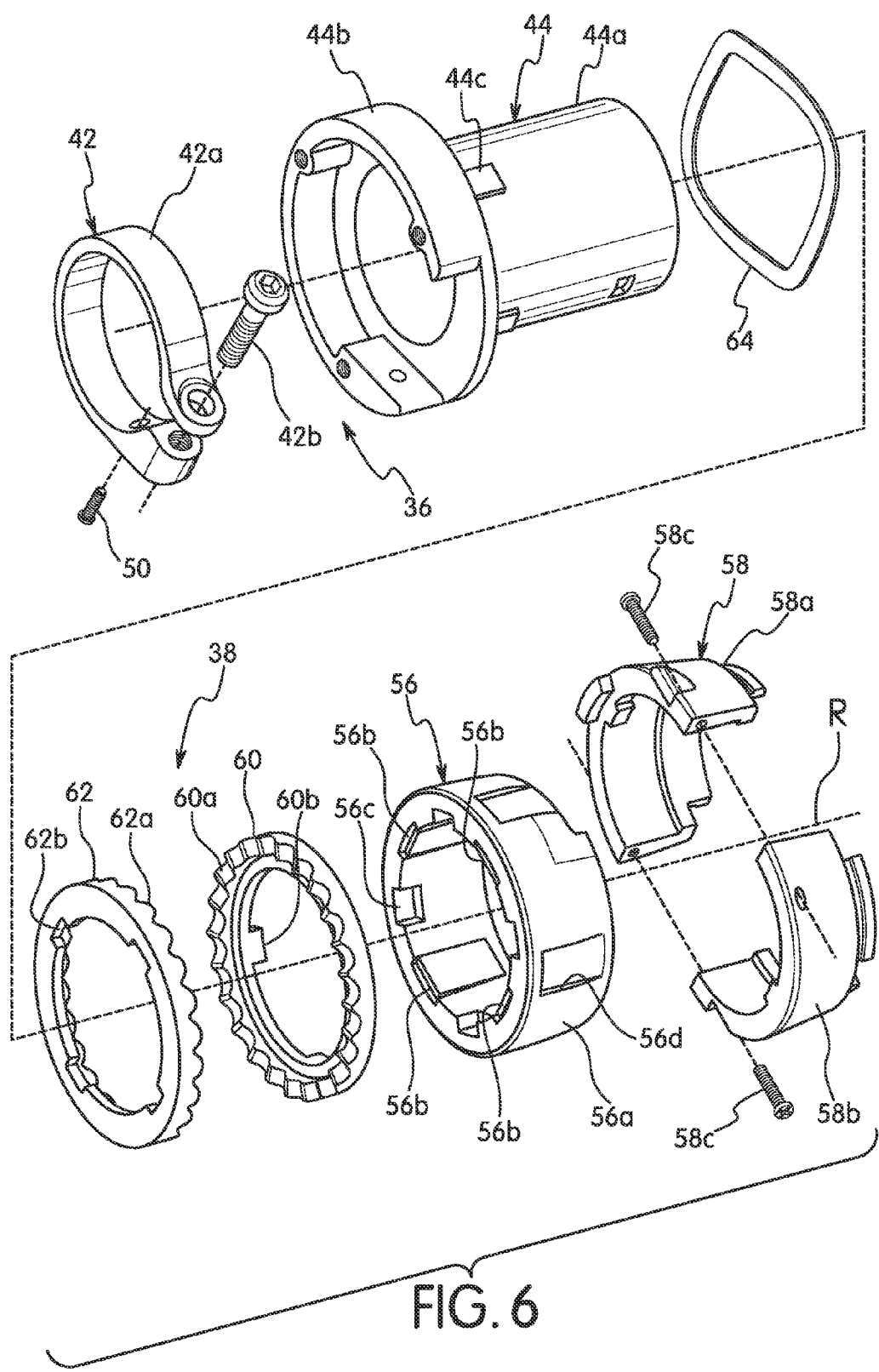
FIG. 6 is a further exploded top perspective view of selected portions of the shifting unit of the right electric control device illustrated in FIGS. 1 to 4.
Figure 7:
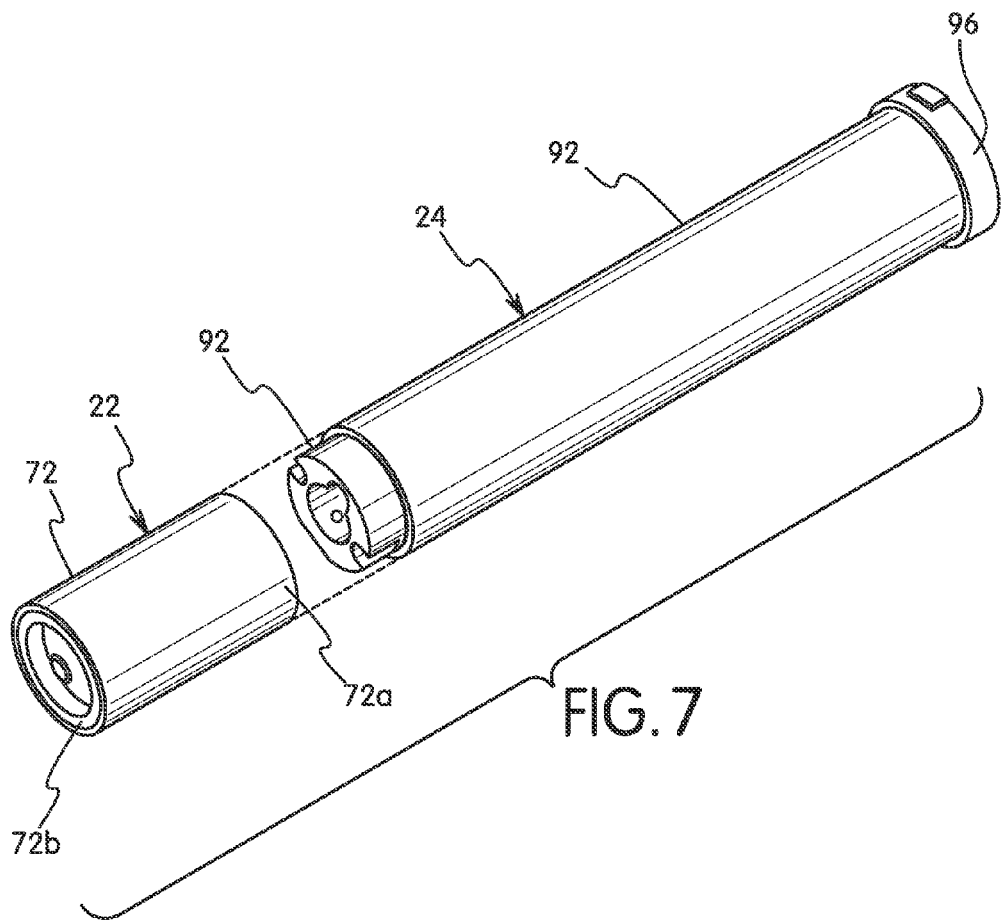
FIG. 7 is a partially exploded top perspective view of the control unit and the battery unit of the right electric control device illustrated in FIGS. 1 to 4.
Figure 8:
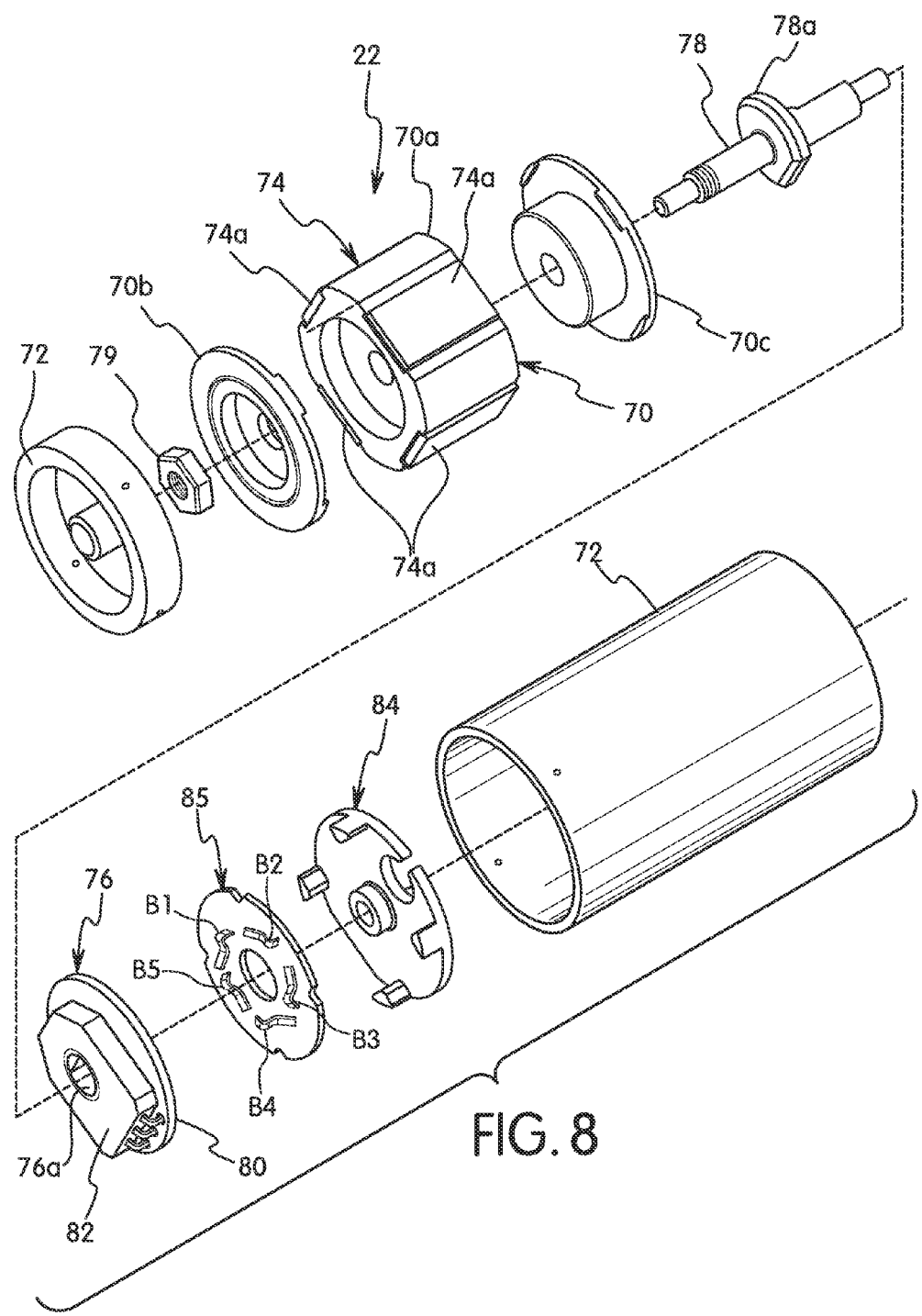
FIG. 8 is an exploded top perspective view of the control unit of the right electric control device illustrated in FIGS. 1 to 4.

As seen in FIGS. 4 to 6, in the illustrated embodiment, the user operating member 36 includes a locating element 58 that couples the inner end of the grip member 26 by the lugs 32, and that retains the position setting unit 38 and the first magnetic element 56 on a tubular portion 44a of the support member 44. The tubular portion 44a constitutes a first base member. The user operating member 36 is rotatably mounted on the tubular portion 44a. The locating element 58 includes two C-shaped clamping elements 58a and 58b that are connected by a pair of screws 58c. The locating element 58 squeezes the handlebar 10 such that the locating element 58 remains stationary with respect to the handlebar 10.

Now the position setting unit 38 will be discussed in more detail with reference mainly to FIGS. 4 to 6. The position setting unit 38 is an indexing mechanism that provides eleven distinct positions for the user operating member 36. Basically, the position setting unit 38 includes a first engagement part 60, a second engagement part 62 and a biasing member 64. The position setting unit 38 is disposed radially between the tubular portion 44a and the user operating member 36 with respect to the rotation axis R of the user operating member 36. The first engagement part 60 is operatively coupled to the first magnetic element 56 of the user operating member 36 such that the first engagement part 60 rotates with the first magnetic element 56 of the user operating member 36. The second engagement part 62 is operatively coupled to the tubular portion 44a of the support member 44 such that the second engagement part 62 does not rotate on the tubular portion 44a about the rotation axis R, but can slide axially on the tubular portion 44a. The first and second engagement parts 60 and 62 are biased together by the biasing member 64.

The first and second engagement parts 60 and 62 are each a ring shaped member formed of a hard rigid material such as a hard, rigid plastic material. The first engagement part 60 has a plurality of first teeth members 60a, while the second engagement part 62 has a plurality of second teeth members 62a. In the illustrated embodiment, the biasing member 64 is a wave spring that is axially disposed between a collar portion 44b of the support member 44 and the second engagement part 62. The biasing member 64 is held in a preloaded condition between the collar portion 44b of the support member 44 and the second engagement part 62 by the locating element 58. In this way, the biasing member 64 biases the first teeth members 60a into engagement with the second teeth members 62a. However, it will be apparent to those skilled in the art from this disclosure that one of the first and second engagement parts 60 and 62 can be provided with only a single tooth member if needed and/or desired.

The first engagement part 60 has three projections 60b that engage three notches 56c in the body member 56a of the first magnetic element 56. In this way, the first engagement part 60 rotates with the first magnetic element 56 as the user operating member 36 is twisted about the rotation axis R. On the other hand, the second engagement part 62 is non-rotatably mounted on the support member 44. In particular, the second engagement part 62 has three notches or cutouts 62b that engage three protrusions 44c on the tubular portion 44a of the support member 44. In this way, the second engagement part 62 can slide axially on the tubular portion 44a of the support member 44 but cannot rotate on the tubular portion 44a of the support member 44.

Figure 3:
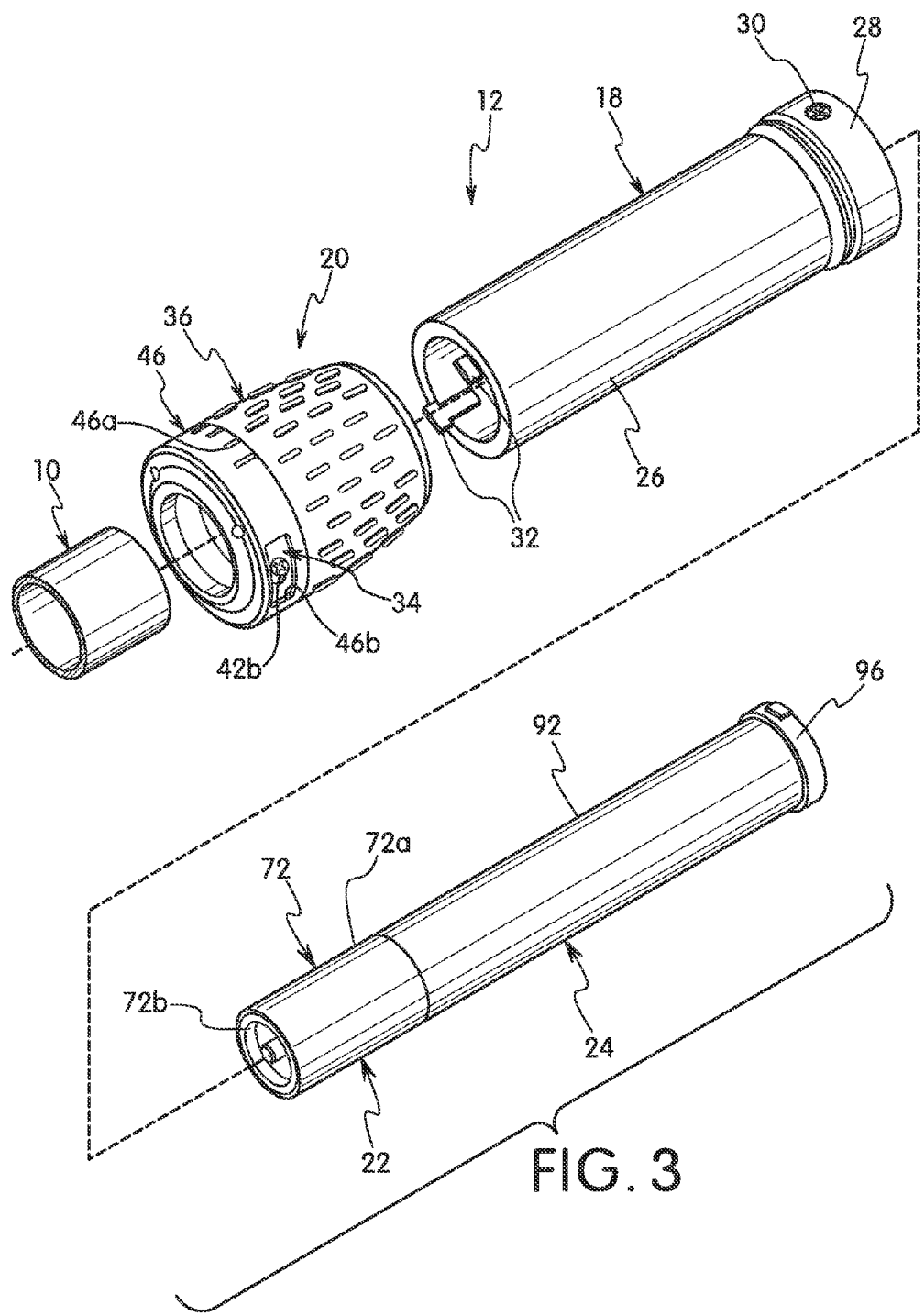
FIG. 3 is an exploded top perspective view of the right electric control device illustrated in FIGS. 1 and 2.

Now the position sensing unit 22 will be discussed in more detail with reference mainly to FIGS. 4 and 8 to 10. Basically, the position sensing unit 22 includes a rotating member 70 rotatably mounted within a tubular support 72 that constitutes a second base member. As seen in FIGS. 3 and 4, the tubular support 72 includes a first part 72a and a second part 72b. The user operating member 36 is rotatably mounted relative to the tubular support 72 about the rotation axis R. The position sensing unit 22 further includes a second magnetic element 74 and a position sensor 76. The position sensor 76 senses a position of the rotating member 70 due to magnetic fields being generated by each of the first and second magnetic elements 56 and 74. In particular, the magnetic fields being generated by each of the first and second magnetic elements 56 and 74 are arranged such that the second magnetic element 74 causes the rotating member 70 to rotate as the first magnetic element 56 is moved by the user operating member 36 being moved.

Here, the second magnetic element 74 is formed of a plurality of permanent magnets 74a. However, it will be apparent to those skilled in the art from this disclosure that the second magnetic element 74 can be formed with only one permanent magnet or can be formed with magnet particles embedded within a base material that is molded to form a main body part 70a of the rotating member 70. Alternatively, the second magnetic element 74 can include one or more electromagnets.

Also when the position sensing unit 22 generates a magnetic field, as discussed below, the second magnetic element 74 does not need to be a magnet that produces its own persistent magnetic field in the absence of an applied magnetic field. Rather, the second magnetic element 74 can be formed with a magnetic material or metal (e.g. iron) that does not produces its own persistent magnetic field in the absence of an applied magnetic field, when the first magnetic element 56 generates a magnetic field (e.g., the first magnetic element 56 is formed of one or more permanent magnets or one or more electromagnets). In such a case of the first magnetic element 56 generating a magnetic field, the body member 70a and the second magnetic element 74 can be integrally formed with magnetic metal (e.g. iron), or the main body part 70a can have separate pieces of magnetic material attached thereto in place of the permanent magnets 74a.

Here in the illustrated embodiment, the rotating member 70 is formed by the main body part 70a having a shaft 78 extending therethrough and a pair of end parts 70b and 70c sandwiching the main body part 70a therebetween. The permanent magnets 74a are disposed in recesses formed in an outer surface of the main body part 70a. A nut 79 is threaded on to one end of the shaft 78 such that the main body part 70a and the end parts 70b and 70c are squeezes between the nut 79 and a flange 78a of the shaft 78. In this way, the main body part 70a and the end parts 70b and 70c rotate as a unit with the shaft 78. The main body part 70a and the end parts 70b and 70c are each formed of a hard rigid material such as a hard, rigid plastic material, while the shaft 78 is preferably made of a metallic material.

The position sensor 76 is fixed to the shaft 78 such that they rotate together. For example, as shown, the position sensor 76 has a non-circular hole 76a that mates with a corresponding non-circular portion of the shaft 78 such that they rotate together. The position sensor 76 has a printed circuit board 80 and a rotary encoder 82 mounted on one side of the printed circuit board 80. As diagrammatically illustrated in FIG. 10, the other side of the printed circuit board 80 is provided with five arc shaped electrical contacts C1, C2, C3, C4 and C5 with each having a center of curvature disposed on the rotation axis R. A stationary disk or member 84 has a printed circuit board 85 non-rotatably disposed thereon. The printed circuit board 85 includes five brushes B1, B2, B3, B4 and B5 that contact the electrical contacts C1, C2, C3, C4 and C5 in a slidable manner as diagrammatically illustrated in FIG. 10 such that current can pass between the printed circuit boards 80 and 85 while the position sensor 76 rotates relative to the printed circuit board 85. The electrical contact C4 and the brush B4 form a potentiometer that indicates a relative position of the rotating member 70 with respect to the tubular portion 44a (the first base member) and the tubular support 72 the second base member). Thus, the electrical contact C4 and the brush B4 of the position sensing unit 22 constitutes a part that varies an output voltage in accordance with an operating position of the user operating member 36 relative to the tubular portion 44a (the first base member) and the tubular support 72 (the second base member). The A/D converter 86C includes a circuit that is configured to selectively output the digital data D1 to D11 in accordance with the output voltage V1 to V11, respectively.

Figures 10, 11:
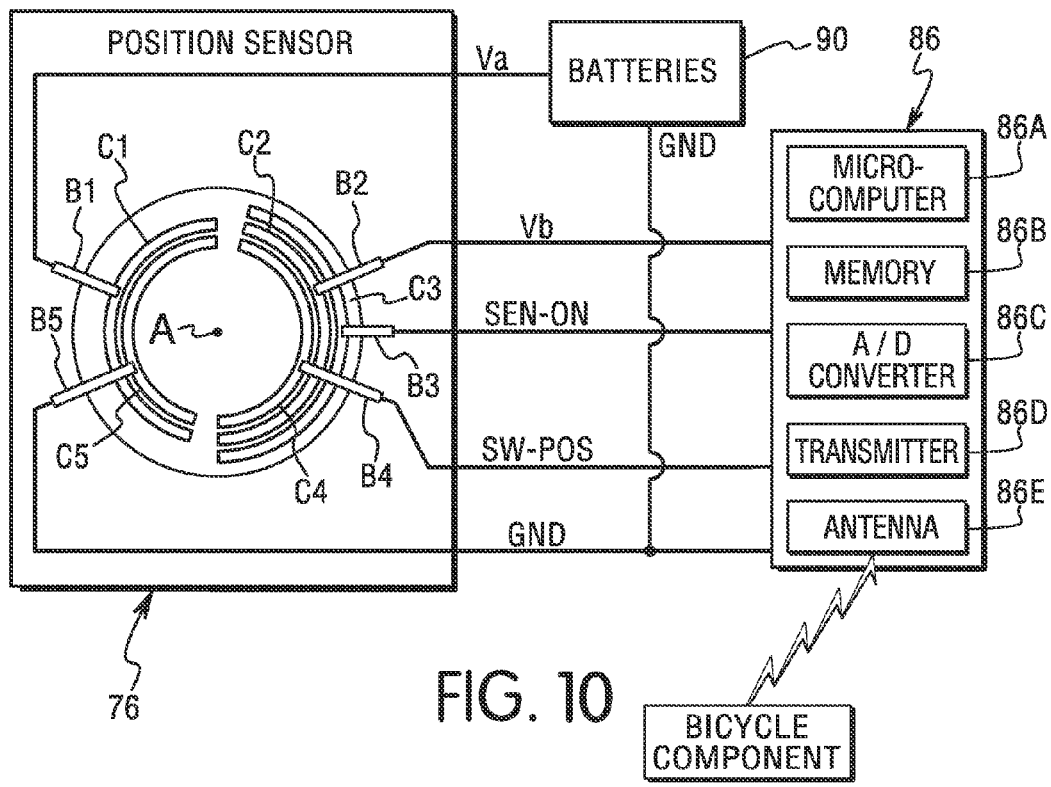
FIG. 10 is a block diagram that diagrammatically illustrates the position sensor, the battery and the controller for the right electric control device illustrated in FIGS. 1 to 4.
FIG. 11 is a table showing the output voltage and digital data for each of the shift stages of the right electric control device illustrated in FIGS. 1 to 4.

As best seen in FIG. 10, the position sensing unit 22 further includes a control unit 86 that includes among other things, a microcomputer 86A, a memory device 86B, an A/D (analog to digital) converter 86C and a wireless transmitter 86D. The memory device 86B, the A/D (analog to digital) converter 86C and the wireless transmitter 86D are electrically connected to the circuit of the microcomputer 86A of the position sensing unit 22. While the microcomputer 86A, the memory device 86B and the A/D converter 86C are located on the same circuit board as the wireless transmitter 86D in the illustrated embodiment, one or more of the microcomputer 86A, the memory device 86B and the A/D converter 86C can alternatively be mounted on the printed circuit board 80. At least two of the microcomputer 86A, the memory device 86B and the A/D converter 86C can be formed of one-chip microcomputer.

Still referring to FIG. 10, the brush B1 is electrically coupled to a pair of batteries 90 via a wire to receive electrical power with a voltage Va. The brush B1 slidably contacts the electrical contact C1 of the printed circuit board 80 to transfer the electrical current with the voltage Va to the position sensor 76. The electrical contacts C2, C3, C4 and C5 of the printed circuit board 80 are in contact with the brushes B2, B3, B4 and B5 to transfer the electrical current to the control unit 86. The electrical current from the brush B2 has a voltage Vb for supplying electrical power to the control unit 86. The electrical current from the brush B3 has a voltage that provides a sensor operating signal SEN-ON to the control unit 86 for indicating the rider has operated the user operating member 36. The electrical current from the brush B4 has a voltage that is varied to provide a position signal SW-POS to the control unit 86. The brush B5 provides a ground connection between the position sensor 76 and the control unit 86.

Basically, the microcomputer 86A detects the corresponding one of the output voltages V1 to V11 from the position sensor 76 and stores (memorizes) the new position corresponding to the detected output voltage in the memory device 86B. The A/D converter 86C of the control unit 86 converts the detected output voltage to the corresponding one of the digital data D1 to D11. The wireless transmitter 86D includes an antenna 86E. The microcomputer 86A uses the wireless transmitter 86D to transmit the digital data D1 to D11 via the antenna 86E.

Figure 9:
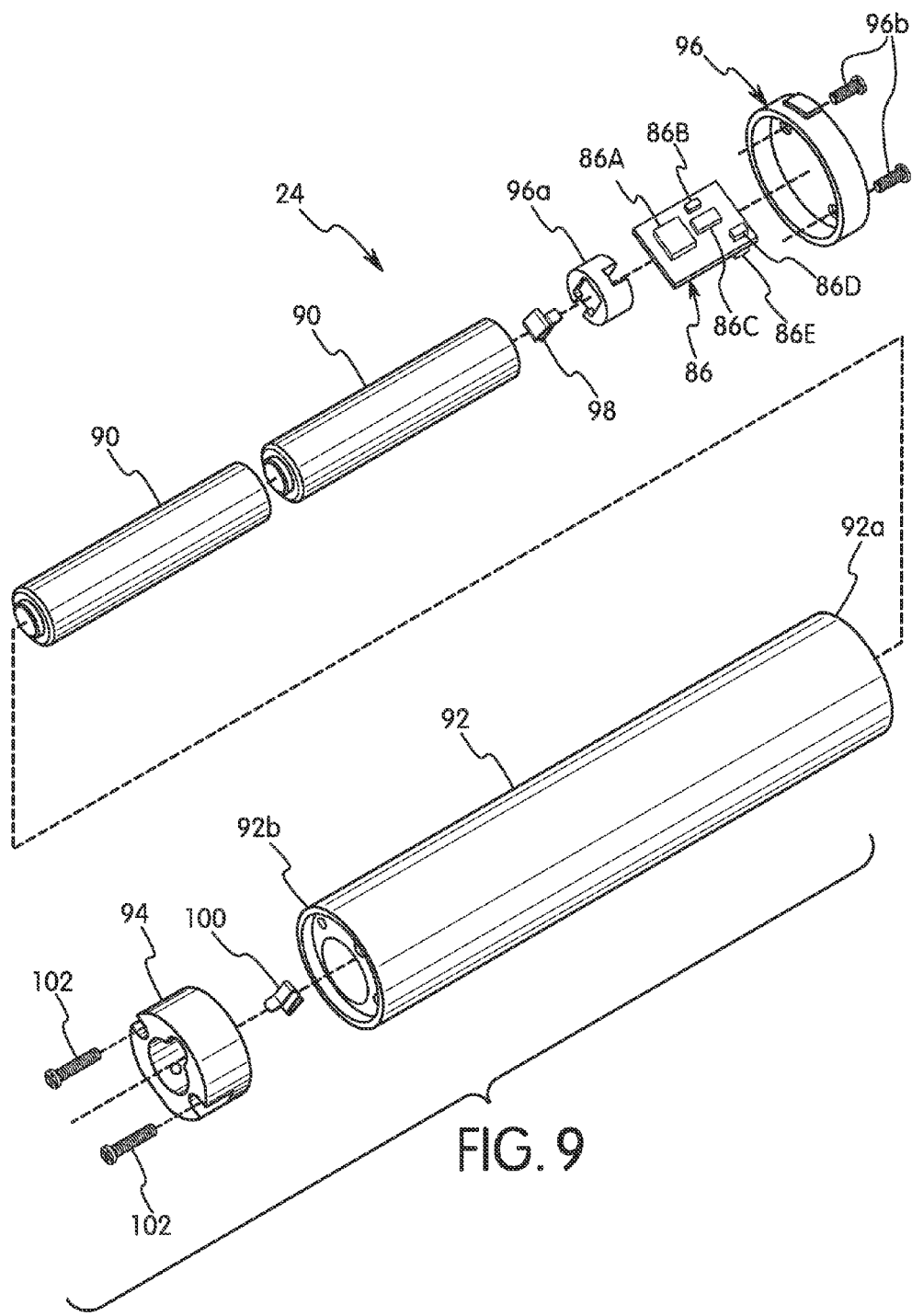
FIG. 9 is an exploded top perspective view of the battery unit of the right electric control device illustrated in FIGS. 1 to 4.

The battery unit 24 includes a tubular battery housing 92, an attachment member 94 and an end cap 96. The battery unit 24 is dimensioned to fit inside the handlebar 10. The end cap 96 supports an electrical contact 98 for the batteries 90 via a contact support member 96a which is fixed to an inside surface of the end cap 96. The end cap 96 is attached to the tubular battery housing 92 at a first longitudinal end 92a of the battery unit 24 by a pair of screws 96b as seen in FIG. 9. The attachment member 94 is fixed to the tubular battery housing 92 at the second longitudinal end 92b of the battery unit 24 that is opposite of the first longitudinal end 92a of the battery unit 24 by a pair of screws 102. The attachment member 94 also supports an electrical contact 100 for the batteries 90. The antenna 86E is located at the first longitudinal end 92a of the battery unit 24, while the position sensor 76 is located at the second longitudinal end 92b of the battery unit 24. Since the end cap 96 is formed of a non-metallic material, the signals from the antenna 86E easily pass through the end cap 96 without any interference.

Figure 12:
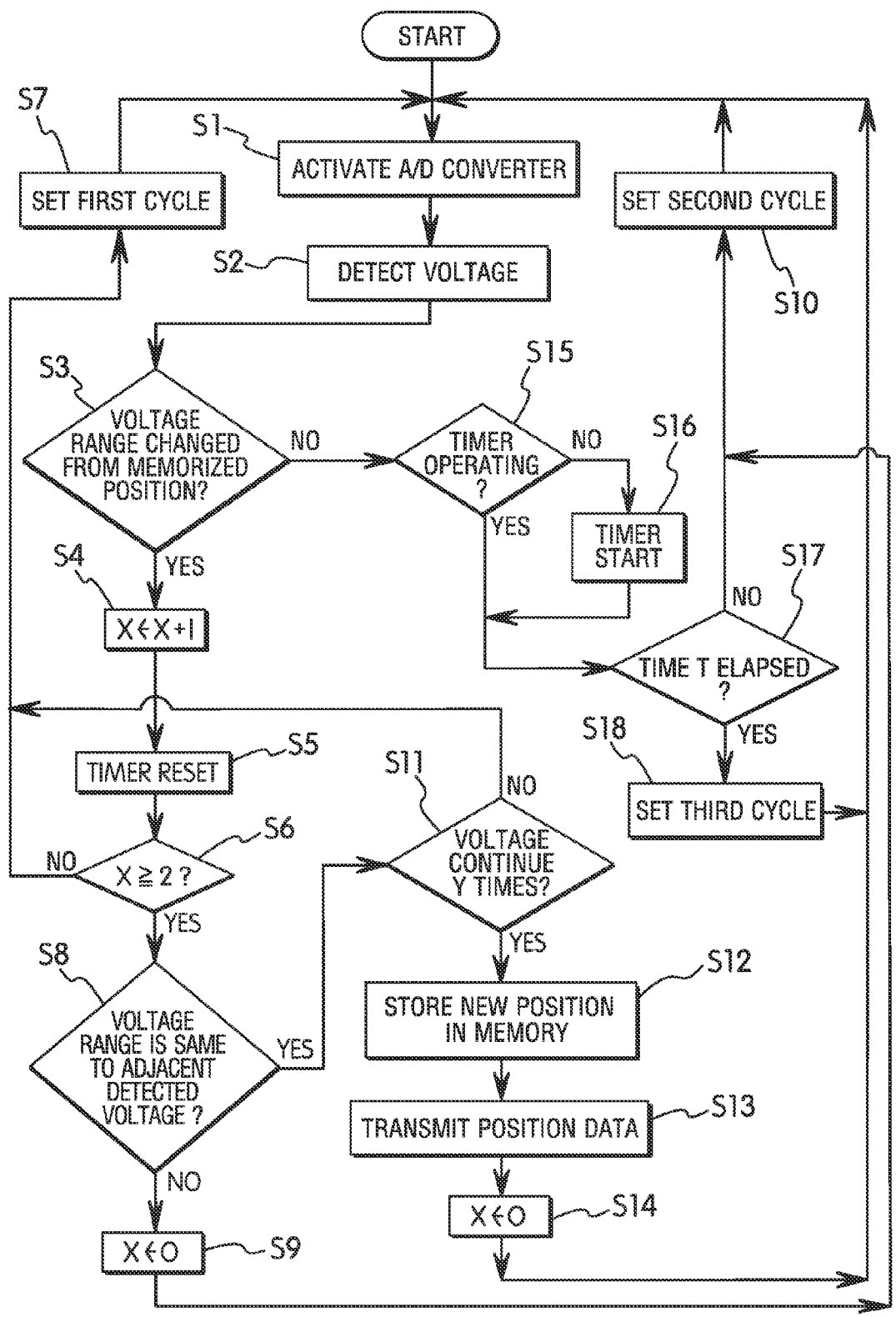
FIG. 12 is a flow chart of the control program executed by the control unit of the right electric control device illustrated in FIGS. 1 to 4.

Turning now to FIGS. 10 to 12, the operation of the electric control device 12 will be discussed. FIG. 10 is a block diagram diagrammatically illustrating the relationship between the position sensor 76, the batteries 90 and the control unit 86 for the electric control device 12. FIG. 11 is a table showing the output voltage and digital data for each of the shift stages of the electric control device 12. FIG. 12 is a flow chart of the control program executed by the control unit of the electric control device 12.

Basically, the batteries 90 supply electrical power to both the position sensor 76 and the control unit 86 at suitable voltages. In the illustrated embodiment, the batteries 90 supply electrical power to the position sensor 76 at the voltage Va and supply electrical power to the control unit 86 at the voltage Vb through the position sensor 76. The voltage of the batteries 90 is also varied within the position sensor 76 to different voltage values to indicate the current position of the user operating member 36 by providing the position signal SW-POS that varies in voltage in accordance with the position of the user operating member 36.

With the electric control device 12, eleven stage positions (e.g., shift positions) are provided by the position setting unit 38. The user operating member 36 and the position setting unit 38 are configured such that the sixth position is a center position of the user operating member 36. The user operating member 36 is operated a prescribed operating amount (e.g., 15°) to change between each of the adjacent stage positions. The position sensor 76 outputs the position signal SW-POS as different voltages V1 to V11 for each of the stage positions in response to the rider twisting (rotating) the user operating member 36. The output voltages V1 to V11 are converted to digital data D1 to D11 by the A/D converter 86C. The digital data D1 to D11 constitutes a component control signal for controlling a bicycle component.

When the user operating member 36 is twisted (rotated) in either rotational direction about the rotation axis R, the first magnetic element 56 rotates such that the magnet fields of the permanent magnets 56b moves relative to the second magnetic element 74. As a result, the magnet fields of the permanent magnets 56b interferes with the magnet fields of the permanent magnets 74a which in turn causes the rotating member 70 to rotate within the handlebar 10. Since the position sensor 76 is fixed to the shaft 78 of the rotating member 70, this rotation of the rotating member 70 results in the position sensor 76 being rotated. Rotation of the position sensor 76 results in one of the output voltages V1 to V11 being sent to the control unit 86 as the position signal SW-POS in accordance with the relative position of the position sensor 76 with respect to the tubular portion 44a (the first base member) and the tubular support 72 (the second base member). The microcomputer 86A detects the corresponding one of the output voltages V1 to V11 (the position signal SW-POS) from the position sensor 76 and stores (memorizes) the new position corresponding to the detected output voltage in the memory device 86B. The A/D converter 86C of the control unit 86 converts the detected output voltage to the corresponding one of the digital data D1 to D11 (the component control signal). The microcomputer 86A uses the output of the A/D converter 86C to detect the output voltages V1 to V11. The microcomputer 86A uses the wireless transmitter 86D to transmit a digital signal with the corresponding one of the digital data D1 to D11 to a bicycle component (e.g., a rear derailleur in the illustrated embodiment) via the antenna 86E.

As seen in FIG. 12, a flow chart illustrates the basic algorithm that is executed by the microcomputer 86A to perform a shifting signal transmission operation. In step S1, the A/D converter 86C is activated once the electric control device 12 is turned on (e.g., by operation of the user operating member 36). Next in step S2, the output voltage from the position sensor 76 is detected by the microcomputer 86A.

The microcomputer 86A then determines if the detected voltage has changes such that the detected voltage is outside of the voltage range corresponding to the memorized position that is stored in the memory device 86B. If the detected voltage is outside of the voltage range corresponding to the memorized position that is stored in the memory device 86B, then the process proceeds to step S4, where a cycle process counter is incremented by one (i.e., X←+1). On the other hand, if the detected voltage is within the voltage range corresponding to the memorized position that is stored in the memory device 86B, then the process proceeds to step S15, which is discussed below.

After the cycle process counter has been incremented in step S4, the process proceeds to step S5 to reset the timer. Next the process proceeds to step S5, where the microcomputer 86A then determines if the number count of cycles of the process is equal to two cycles or more (i.e., X≧2). If the number count of cycles of the process has not reached two cycles or more, then the process proceeds to step S7, where the microcomputer 86A sets a first prescribed detection interval of a first cycle for processing the process of the flow chart in FIG. 12. For example, the first prescribed detection interval of the first cycle can be 5 msec between each time the A/D converter 86C is activated. Thus, to set the first cycle, the microcomputer 86A sets a detecting cycle for detecting the sensor or a waiting time for the detection cycle. To save electric power, the microcomputer 86A activates the A/D converter 86C when the microcomputer 86A detects the voltage. In this way, the microcomputer 86A can quickly detect a position change of the user operating member 36. From step S7, the process proceeds back to step S1.

In step S6, if the number of cycles of the process is equal to two cycles or more, then the process proceeds to step S8, where the microcomputer 86A determines if the voltage range is same to adjacent detected voltage. If the voltage range is not the same to adjacent detected voltage, then the process proceeds to step S9, where the cycle process counter is set to zero (i.e., X←0). On the other hand, if the voltage range is the same to adjacent detected voltage, then the process proceeds to step S11, which is discussed below.

From step S9, the process proceeds to step S10, where the microcomputer 86A sets a second prescribed detection interval of a second cycle for processing the process of the flow chart in FIG. 12. For example, the second prescribed detection interval of the second cycle can be 100 msec (10 Hz) between each time the A/D converter 86C is activated. In this way, the microcomputer 86A can conserve the electrical power of the batteries 90. From step S10, the process proceeds back to step S1 and operates at the second prescribed detection interval. Thus, to set the second cycle, the microcomputer 86A sets a detecting cycle for detecting the sensor or a waiting time for the detection cycle.

In step S11, the microcomputer 86A determines if the detected voltage has continued "Y" times, wherein "Y" is equal to a value of 3 or more (e.g., 5). If the detected voltage has not continued "Y" times, the process proceeds to step S7 where the microcomputer 86A set the first cycle. On the other hand, if the detected voltage has continued "Y" times, then the process proceeds to step S12, where the microcomputer 86A stores (memorizes) the new position corresponding to the detected voltage in the memory device 86B.

From step S12, the process then proceeds to step S13, where the wireless transmitter 86D transmits a position data which is stored in the memory device 86B. From step S13, the process proceeds to step S14, where the cycle process counter is set to zero (i.e., X←0). From step S14, the process proceeds back to step S1 and continues to operate at the first prescribed detection interval.

Referring back to step S3, if the detected voltage is within the voltage range corresponding to the memorized position that is stored in the memory device 86B, then the process proceeds to step S15, where the microcomputer 86A determines if the timer is operating. If the timer is not operating, then the process proceeds to step S16, where the timer is started. If the timer has already been started, then step S16 is skipped and the process proceeds to step S17, where the microcomputer 86A determines if a time T (e.g., ten minutes) elapsed. If time T has elapsed, then the process proceeds to step S18, where the microcomputer 86A sets a third prescribed detection interval of a third cycle for processing the process of the flow chart in FIG. 12. For example, the third prescribed detection interval of the third cycle can be 1 sec (1 Hz) between each time the A/D converter 86C is activated. In this way, the microcomputer 86A can enter a sleep mode to further conserve the electrical power of the batteries 90. To save electric power, the microcomputer 86A activates the A/D converter 86C only when the microcomputer 86A detects a voltage change. From step S18, the process proceeds back to step S1 and operates at the third prescribed detection interval. Thus, to set the third cycle, the microcomputer 86A sets a detecting cycle for detecting the sensor or a waiting time for the detection cycle. To save electric power, the microcomputer 86A activates the A/D converter 86C when the microcomputer 86A detects the voltage. Preferably, the wireless transmitter 86D of the control unit 86 can be a wireless transmitter-receiver that includes a wireless receiver circuit to receive a signal from a bicycle component or speed sensor. In this case, if the control unit 86 either does not receive a signal from a bicycle component or a speed sensor for predetermined time, or does not received a periodic signal from a bicycle component or a speed sensor, then the control unit 86 sets the detection interval to the third prescribed detection interval soon thereafter.

In above embodiment, the position sensor 76 and the printed circuit board 85 with the brushes B1, B2, B3, B4 and B5 form a sensor unit that includes a potentiometer to detect the position of the user operating member 36, but the sensor unit can include other detecting arrangements or structures (e.g. a sensing arrangement having a pair of magnetic materials and a hole element, or an optical absolute encoder) to detect the position of the user operating member 36.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electric control device comprising:
    a fixed member having a bicycle mounting part;
    a user operating member movably mounted to the fixed member, the user operating member including a first magnetic element; and
    a position sensing unit having a rotating member and a position sensor that senses a position of the rotating member, the rotating member including a second magnetic element that rotates the rotating member as the user operating member is moved,
    at least one of the first and second magnetic elements being configured to generate a magnetic field.

2. The electric control device according to claim 1, wherein the first magnetic element includes at least one permanent magnet.

3. The electric control device according to claim 1, wherein the second magnetic element includes at least one permanent magnet.

4. The electric control device according to claim 1, wherein the fixed member further includes a first base member, and the rotating member is rotatably mounted relative to a second base member.

5. The electric control device according to claim 4, wherein the user operating member is rotatably mounted relative to the first base member.

6. The electric control device according to claim 5, further comprising
    a position setting unit operatively coupled between the first base member and the user operating member such that the position setting unit selectively maintains the user operating member in one of a plurality of operating positions relative to the second base member.

7. The electric control device according to claim 6, wherein the position setting unit is disposed radially between the first base member and the user operating member with respect to a rotation axis of the user operating member.

8. The electric control device according to claim 6, wherein the position setting unit includes a first engagement part having at least one first tooth member coupled to one of the first base member and the user operating member, a second engagement part having a plurality of second teeth members coupled to the other one of the first base member and the user operating member, and a biasing member biasing the first tooth member into engagement with the second teeth members.

9. The electric control device according to claim 1, wherein the position sensing unit further includes a part that varies an output voltage in accordance with an operating position of the user operating member relative to the fixed member.

10. The electric control device according to claim 9, wherein
    the circuit of the position sensing unit is further configured to output digital data in accordance with the output voltage.

11. The electric control device according to claim 9, wherein
    the position sensing unit further includes a wireless transmitter electrically connected to the circuit of the position sensing unit.

12. The electric control device according to claim 9, further comprising
    a battery unit electrically connected to the position sensing unit.

13. The electric control device according to claim 12, where
    the battery unit and the position sensing unit are dimension to be received within a bicycle handlebar.

14. The electric control device according to claim 13, wherein
    the wireless transmitter includes an antenna located at a first longitudinal end of the battery unit and the position sensor is located at a second longitudinal end of the battery unit that is opposite of the first longitudinal end of the battery unit.

15. The electric control device according to claim 14, wherein
    the battery unit includes a tubular battery housing and a non-metallic end cap attached to the tubular battery housing at the first longitudinal end of the battery unit.

16. The electric control device according to claim 15, wherein
    the position sensing unit is fixed to the tabular battery housing at the second longitudinal end of the battery unit.

* * * * *